United States Patent [19]

Nagai et al.

[11] Patent Number: 5,584,969
[45] Date of Patent: Dec. 17, 1996

[54] APPARATUS FOR THERMALLY DECOMPOSING PLASTICS AND PROCESS FOR CONVERTING PLASTICS INTO OIL BY THERMAL DECOMPOSITION

[75] Inventors: Kenichi Nagai, Takatsuki; Kenji Yasuda, Amagasaki; Toshio Hama, Nishinomiya; Yoshitoshi Sekiguchi, Maizuru; Toshio Tachibana, Nara; Osamu Nakanishi, Kadoma; Tadashi Moriyama, Yamatotakada, all of Japan

[73] Assignee: Hitachi Zosen Corporation, Osaka, Japan

[21] Appl. No.: 282,269

[22] Filed: Jul. 29, 1994

[30] Foreign Application Priority Data

| Jul. 29, 1993 | [JP] | Japan | 5-187820 |
| Jul. 30, 1993 | [JP] | Japan | 5-189571 |
| Aug. 4, 1993 | [JP] | Japan | 5-193287 |
| Dec. 16, 1993 | [JP] | Japan | 5-316587 |
| May 13, 1994 | [JP] | Japan | 6-099740 |

[51] Int. Cl.$^6$ .............. C10G 7/00; C10G 1/02; C10B 9/00
[52] U.S. Cl. .............. 196/116; 196/114; 196/138; 202/96; 202/99; 201/25; 585/241; 208/427
[58] Field of Search .............. 196/116, 114, 196/123, 138; 422/259; 202/96, 205, 99; 585/241; 208/427; 201/25; 159/DIG. 16; 203/91, DIG. 14

[56] References Cited

U.S. PATENT DOCUMENTS

| 3,956,414 | 5/1976 | Oshima | 260/683 R |
| 3,974,206 | 8/1976 | Tatsumi et al. | 260/486 R |
| 3,984,288 | 10/1976 | Kitaoka et al. | 585/241 |
| 4,187,672 | 2/1980 | Rasor | 60/39.19 |
| 4,507,174 | 3/1985 | Kutrieb | 202/97 |
| 4,552,621 | 11/1985 | Lyakhevich et al. | 202/84 |
| 4,584,421 | 4/1986 | Saito et al. | 585/241 |
| 5,070,109 | 12/1991 | Vlick et al. | 521/41 |
| 5,368,723 | 11/1994 | Takahashi et al. | 208/427 |

FOREIGN PATENT DOCUMENTS

| 2176776 | 3/1973 | France . |
| 3027265 | 11/1982 | Germany . |
| 4103738 | 2/1991 | Germany . |

*Primary Examiner*—Nina Bhat
*Attorney, Agent, or Firm*—Armstrong, Westerman, Hattori, McLeland & Naughton

[57] ABSTRACT

A thermal decomposition apparatus for plastics wherein plastics are melted and thermally decomposed, and the resulting decomposition gas is cooled for condensation and recovered in the form of a thermal decomposition oil. The apparatus comprises a thermal decomposition reactor for melting and thermally decomposing the plastics therein, an extraneous matter discharge duct having one end opened in a melt of plastics within the reactor, an extraneous matter collecting container connected to the other end of the discharge duct, and an aspirator for aspirating extraneous matter within the reactor together with the melt through the discharge duct into the container.

13 Claims, 10 Drawing Sheets

APPARATUS FOR THERMALLY DECOMPOSING PLASTICS AND PROCESS FOR CONVERTING PLASTICS INTO OIL BY THERMAL DECOMPOSITION

BACKGROUND OF THE INVENTION

The present invention relates to apparatus for melting and thermally decomposing, for example, waste plastics and cooling the resulting thermal decomposition gas for condensation to thermal decomposition oil for recovery, and a process for melting and thermally decomposing waste plastics including polyvinyl chloride and cooling the resulting thermal decomposition gas for condensation to thermal decomposition oil for recovery.

Throughout the specification and the claims appended thereto, a treatment for removing HCl gas resulting from thermal decomposition from the system will be referred to as "desalting," and a chemical agent to be reacted with the HCl gas for the purpose of desalting and a device therefor will be referred to as a "desalting agent" and a "desalting column," respectively.

As one of such processes for thermally decomposing plastics, a process has been practiced which comprises melting and thermally decomposing plastics in a thermal decomposition reactor, feeding the resulting gas to a catalyst layer to decompose the gas into hydrocarbons of low carbon chain and thereafter condensing the hydrocarbons in a cooling-condensation unit to recover a light oil.

The plastics to be treated by such a process are generally those delivered by plastics manufacturers as industrial wastes and those discharged as classified refuse. Accordingly, these plastics i.e., the material to be treated, includes metals, glasses and like extraneous matter as mixed therewith. During melting in the above process, the extraneous matter is released into the melt and therefore poses the problem that is plastics are continuously treated for thermal decomposition, the extraneous matter accumulates in the melt to fill up the reactor for melting and thermally decomposing plastics.

To solve this problem, accordingly, the apparatus is conventionally brought out of operation intermittently and cooled nearly to ambient temperature, and the accumulated extraneous matter is thereafter removed from the reactor.

However, the process involves a great energy loss in cooling the apparatus nearly to ambient temperature for the removal of extraneous matter and also a great energy loss as needed for heating to resume the operation after the removal, hence the problem exists of increased fuel consumption for the thermal decomposition.

The waste plastics delivered by plastics manufacturers as industrial wastes and the waste plastics discharged as separated refuse contain large quantities of waste polyvinyl chloride, so that if the waste plastics are collectively treated for thermal decomposition, decomposition of the polyvinyl chloride present procedures HCl gas, which is likely to cause corrosion to the decomposition reactor, and the condenser and recovery unit which are subsequent to the reactor, further contributing to occurrence of pollution. Usually, polyvinyl chloride wastes are selectively removed roughly before thermal decomposition but invariably partly remain unremoved.

Already known among techniques for converting waste plastics into oil by thermal decomposition is a process for treating waste plastics including polyethylene, polypropylene, polyvinyl chloride, polyurethane, ABS resin, etc. by thermally decomposing these resins batchwise with addition of an alkali aqueous solution of high concentration under pressure of 10 kg/cm$^2$ at a decomposition temperature of 400° C. to 500° C., and a batchwise two-stage thermal decomposition process involving a fixed catalyst phase-gas catalytic reaction for treating waste plastics as separated from motor vehicle shredder dust and common wastes and including polyethylene, polypropylene, polyvinyl chloride, ABS resin, etc., waste plastics being melted and dechlorinated in the first stage, and converted into oil by thermal decomposition in the second stage. The former process is practiced at a high pressure so as to hold water within the decomposition reactor and to recover low-boiling decomposition products only. The addition of the alkali aqueous solution results in expedited thermal decomposition but entails the drawback of giving an increased heavy oil fraction. With the latter process, the thermal decomposition oil is free from HCl gas produced, whereas measures need to be taken for preventing the decomposition gas recovery unit from corrosion with HCl gas.

The two processes described, however, are in the stage of basic experiments and have not been placed into actual use.

SUMMARY OF THE INVENTION

An object of the present invention is to provide a thermal decomposition apparatus for plastics which is free of the foregoing problems and from which extraneous matter can be removed without shutting off the apparatus to reduce the energy loss to be involved in the removal of extraneous matter.

Another object of the present invention is to provide a process for converting plastics into oil by thermal decomposition in which process HCl gas produced by the thermal decomposition of plastics including polyvinyl chloride is removed in the form of a solid chloride to thereby obviate the corrosion of the apparatus due to the HCl gas and solve the problem that the HCl gas becomes mixed with the recovered oil.

The present invention provides a first apparatus for thermally decomposing plastics wherein plastics are melted and thermally decomposed, and the resulting decomposition gas is cooled for condensation and recovered in the form of a thermal decomposition oil, the apparatus comprising a thermal decomposition reactor for melting and thermally decomposing the plastics therein, an extraneous matter discharge duct having one end opened in a melt of plastics within the reactor, an extraneous matter collecting container connected to the other end of the discharge duct, and aspiration means for aspirating extraneous matter from the reactor together with the melt of plastics through the discharge duct into the collecting container.

The present invention provides a second apparatus for thermally decomposing plastics wherein plastics including polyvinyl chloride are melted and thermally decomposed, and the resulting decomposition gas is cooled for condensation and recovered in the form of a thermal decomposition oil, the apparatus comprising a thermal decomposition reactor for melting and thermally decomposing the polyvinyl chloride-including plastics therein, an extraneous matter discharge duct having one end opened in a melt of plastics within the reactor, and extraneous matter collecting container connected to the other end of the discharge duct, aspiration means for aspirating extraneous matter from the reactor together with the melt of plastics through the discharge duct into the collecting container, means disposed downstream from the reactor for applying a desalting agent to a thermal decomposition gas containing HCl gas and produced in the reactor, a desalting column disposed downstream from the supplying means for reacting the HCl gas in the decomposition gas with the desalting agent, and a condenser disposed downstream from the desalting column for cooling the decomposition gas for condensation to obtain a thermal decomposition oil.

For use in converting plastics including polyvinyl chloride into oil by thermal decomposition, the present invention provides a process for thermally decomposing plastics to obtain oil characterized by reacting HCl gas produced by thermal decomposition with a desalting agent to convert the HCl gas into a solid chloride, removing the chloride from a gas resulting from the thermal decomposition and thereafter recovering oil produced by condensation of the decomposition gas.

With the first apparatus of the invention for thermally decomposing plastics, the melt of plastics within the reactor and the extraneous matter present in the melt are guided through the discharge duct into the collecting container by suction, i.e., by the aspiration means, so that the extraneous matter can be removed during the operation of the apparatus. This eliminates the need to shut off the apparatus and cool the apparatus nearly to ambient temperature, reduces the energy loss involved in the removal of the extraneous matter and diminishes the fuel consumption required for the thermal decomposition.

Like the first apparatus, the second thermal decomposition apparatus of the invention reduces the energy loss to be involved in removing extraneous matter an diminishes the fuel consumption needed for the thermal decomposition. When the desalting agent is supplied to the thermal decomposition gas containing HCl gas and produced in the reactor by the supplying means which is disposed downstream from the reactor, the HCl gas in the decomposition gas reacts with the desalting agent within the desalting column and is removed from the decomposition gas in the form of a solid chloride. The HCl gas is therefore prevented from causing corrosion to the apparatus and from becoming incorporated into the thermal decomposition oil.

The process of the invention for converting plastics into oil by thermal decomposition prevents HCl gas from causing corrosion to the apparatus and from the gas from becoming mixed with the decomposition oil.

The present invention will be described in greater detail with reference to the accompanying drawings.

DESCRIPTION OF THE PREFERRED EMBODIMENT

Throughout FIGS. 1 to 11, like parts are designated by like reference numerals and will not be described repeatedly.

Figure 1:
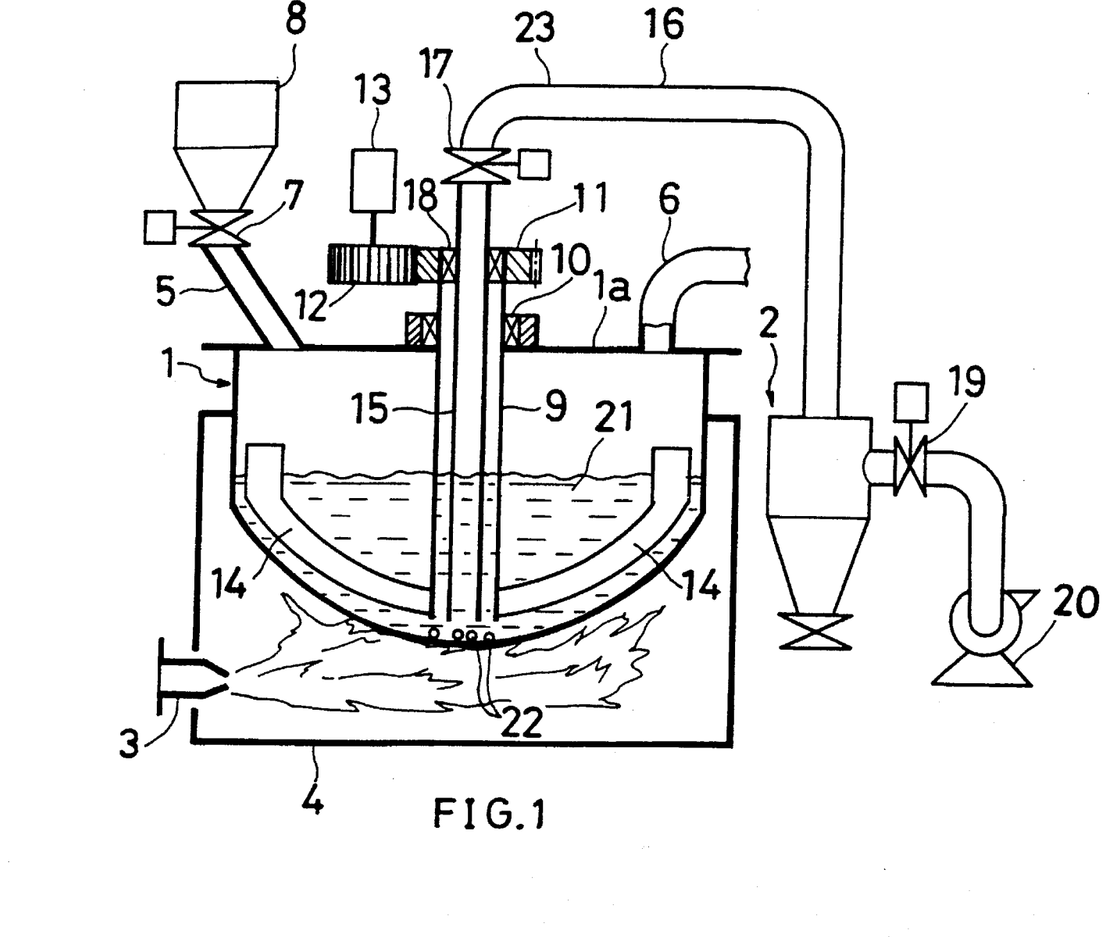
FIG. 1 is a view in vertical section of a first embodiment of plastics thermal decomposition apparatus of the invention.

FIG. 1 shows an apparatus of the invention for thermally decomposing plastics as a first embodiment.

Referring to FIG. 1, the thermal decomposition apparatus for plastics comprises a thermal decomposition reactor 1 for melting and thermally decomposing material plastics, and an extraneous matter collecting container 2.

The reactor 1 is disposed in a furnace 4 having a heating burner 3. The bottom wall of the reactor 1 has a downwardly curving-in concave upper surface. The reactor 1 is provided with a closure 1a having connected thereto a supply duct 5 for material plastics and a thermal decomposition gas discharge duct G. The supply duct 5 is connected to a material hopper 8 via a valve 7. The discharge duct 6 is connected to a portion having an unillustrated catalyst layer for further decomposing hydrocarbons. The reactor produces a thermal decomposition gas, which is sent through the discharge duct 6 to the portion having the catalyst layer, by which the gas is further decomposed catalytically. The resulting gas is then sent to a cooling-condensation unit for condensation, and the condensate is recovered from the unit as a light oil.

A hollow vertical shaft 9 extends through the closure 1a of the reactor 1. The clearance in a hole formed in the closure 1a around the shaft 9 is sealed with a seal device 10. The rotary shaft 9 has a lower end positioned close to the bottom of the reactor 1 and an upper end positioned above the closure 1a and coupled to a drive motor 13 by gears 11, 12. The lower end of the vertical rotary shaft 9 is fixedly provided with a plurality of agitating blades 14. The agitating blades 14 each have a generally arcuate lower edge in conformity with the shape of the bottom wall upper surface of the reactor 1.

Provided inside the rotary shaft 9 is an extraneous matter suction pipe 15, which has an upper end extending upward beyond the upper end of the shaft 9 and connected to the extraneous matter collecting container 2 by a conduit 16. A valve 17 is interposed between the suction pipe 15 and the conduit 16. The suction pipe 15 and the conduit 16 constitute an extraneous matter discharge duct 23. The clearance in the upper end of the shaft 9 around the suction pipe 15 is sealed off with a seal device 18. The extraneous matter suction pipe 15 has a lower end positioned approximately at the same level as the lower end of the rotary shaft 9.

The container 2 is connected to a vacuum pump 20 (pressure adjusting means) with a valve 19 interposed therebetween. Usually the valve 19 is in an open state, and the valve 17 in a closed state. The vacuum pump 20, when operated, holds the conduit 16 and the container 2 evacuated.

With the apparatus described above, material plastics including extraneous matter, such as industrial wastes, are supplied from the hopper 8 to the reactor 1 through the supply duct 5 by opening the valve 7. The plastics are heated and melted with the heat of combustion of the burner 3 to form a melt 21. For an expedited reaction, the rotary shaft 9 is rotated by the drive motor 13 to agitate the melt 21 within the reactor 1 by the agitating blades 14. When maintained at a temperature of at least 140° C., the melt 21 undergoes a thermal decomposition reaction and produces a thermal decomposition gas although the temperature is dependent on the type of plastics. The decomposition gas consists primarily of hydrocarbon gases having 1 to 40 carbon atoms. The decomposition gas produced is sent through the discharge duct 6 to a unit having a catalyst layer, further decomposed into hydrocarbons of low carbon chain in the unit and thereafter led into a cooling-condensation unit, in which the gas is cooled for condensation. Thus, a light oil is recovered.

When the above operation is continued, extraneous matter 22, such as metals and glass, which is present in the melt 21 becomes accumulated within the reactor 1. Consequently, extraneous matter 22 including metals and glasses and having great specific gravity becomes accumulated on the central portion of bottom surface of the reactor owing to a collecting effect produced by the shape of the lower edges of the agitating blades 14 and to the shape of the bottom wall upper surface of the reactor 1. When the amount of accumulating extraneous matter 22 increases, problems arise such as damage to the agitating blades 14 and adhesion of scorching melt to the bottom of the reactor 1. When the vacuum pump 20 is operated with the valves 17, 19 opened to avoid the problems, the melt 21 in the reactor 1 is aspirated together with the extraneous matter 22 through the suction pipe 15 and the conduit 16, i.e., through the discharge duct 23, into the container 2 which is evacuated. In this way, the extraneous matter 22 is removed without bringing the apparatus out of operation.

The thermal decomposition of plastics inevitably produces inorganic carbon, which accumulates in the melt 21. The accumulation of inorganic carbon in the reactor 1 can be prevented by aspirating the melt 21 periodically or from time to time aside from the removal of extraneous matter such as metals and glasses.

With the first embodiment described, a vacuum pump serving as means for adjusting the internal pressure of the extraneous matter collecting container 2 to a value lower than atmospheric pressure is used as the means for aspirating extraneous matter, whereas this is not limitative. For example, a pressure adjusting means is usable which is adapted to maintain a specified pressure within the system which is connected to the extraneous matter collecting container and wherein an amount of gas corresponding to the evacuation by the vacuum pump is condensed by initially evacuating the system and thereafter cooling the container.

Figure 2:
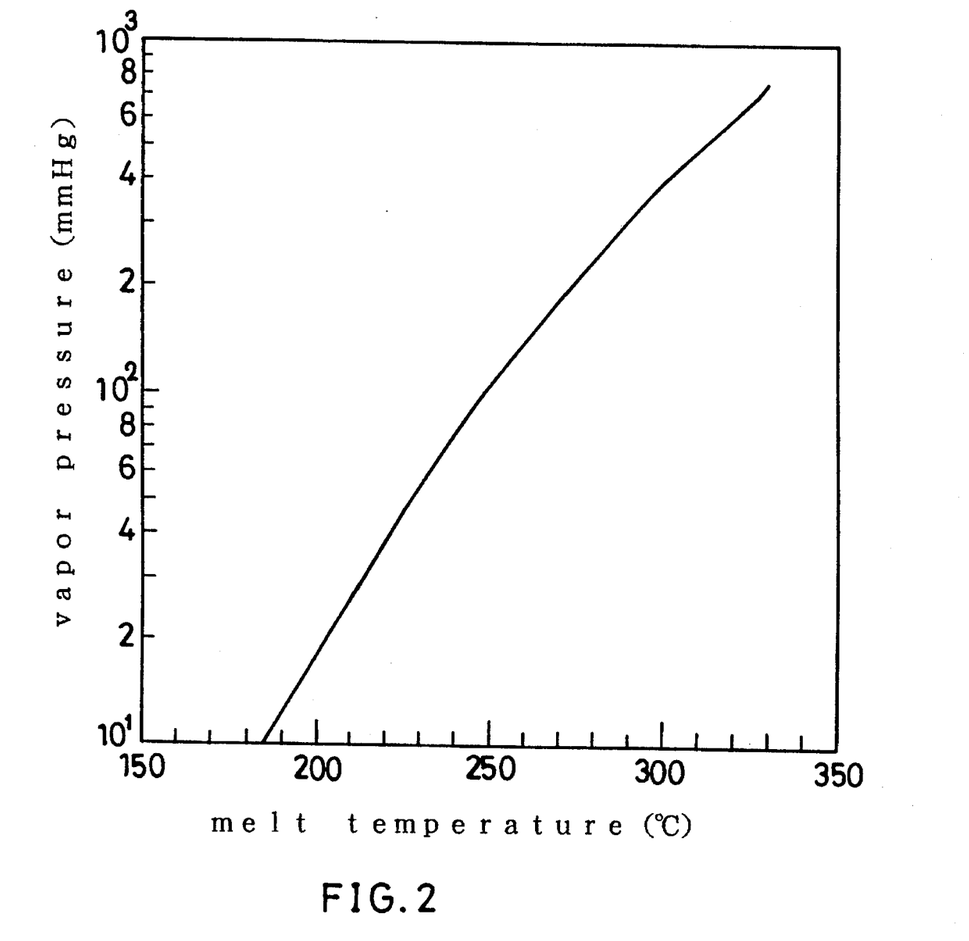
FIG. 2 is a graph showing the relationship between the temperature of a typical melt of plastics and the vapor pressure.
Figure 3:
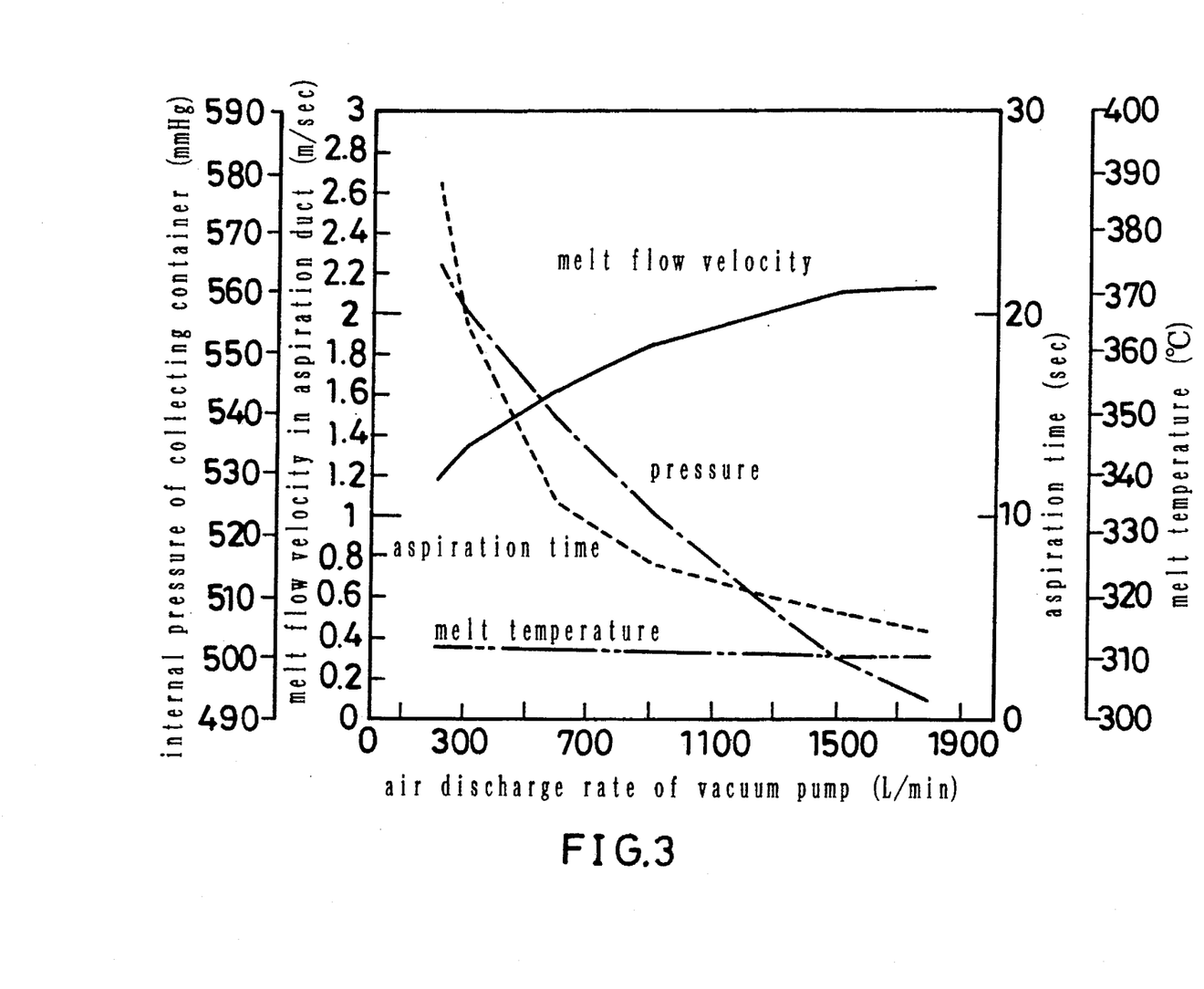
FIG. 3 is a graph showing the rate of evacuation by a vacuum pump and the state of suction.

The apparatus of the first embodiment was used for an actual operation, which will be described next with reference to FIGS. 2 to 4. FIG. 2 is a graph showing the relationship between the temperature of a typical melt of plastics and the vapor pressure, FIG. 3 is a graph showing the evacuation rate of the vacuum pump and the state of suction, and FIG. 4 is a graph showing the relationship between the evacuation rate of the vacuum pump and extraneous matter aspirated.

The inside diameter of the suction pipe 15 and the conduit 16 was 50 mm, the length of the extraneous matter discharge duct 23 from the inlet (lower end) of the pipe 15 to the container 2 was 5 m, and the head between the liquid level of the melt 21 in the reactor 1 and the container 2 was 3 m. The container 2 was 100 liters in capacity, the vacuum pump 20 was 500 liters/min in evacuation rate, and the plastics melt 21 in the reactor 1 was 330° C. in temperature. The interior of the conduit 16 and the container 2 was held in a vacuum by operating the vacuum pump 20 with the valve 19 opened and the valve 17 closed.

The valve 17 was then opened, whereupon the vapor collecting in the upper portion of the suction pipe 15 was aspirated. Since the interior of the reactor 1 was maintained at atmospheric pressure (760 mmHG), a pressure difference occurred between the interior of the reactor 1 and the interior of the container 2, with the result that aspiration of vapor was followed by aspiration of the melt 21 within the suction pipe 15 while the melt flashed into vapor, whereby the melt was led into the container 2 via the conduit 16. The state of melt thus aspirated is dependent on the evacuation rate of the pump 20. When 10 liters of melt 21 was aspirated using the vacuum pump 20 of 500 liters/min, the melt 21 flashed into vapor the moment when the valve 17 was opened, the internal pressure of the container 2 increased from 0 mmHg to 543 mmHg, and the melt 21, deprived of the latent heat of evaporation, had its temperature reduced from 330° C. to 314 ° C. Owing to the pressure difference between the container 2 and the reactor 1, the melt 21 was aspirated through the pipe 15 and conduit 16 at a velocity of 1.53 m/sec and flowed into the container 2. The aspiration of 10 liters of the melt 21 before evaporation required 13.5 seconds.

Figure 4:
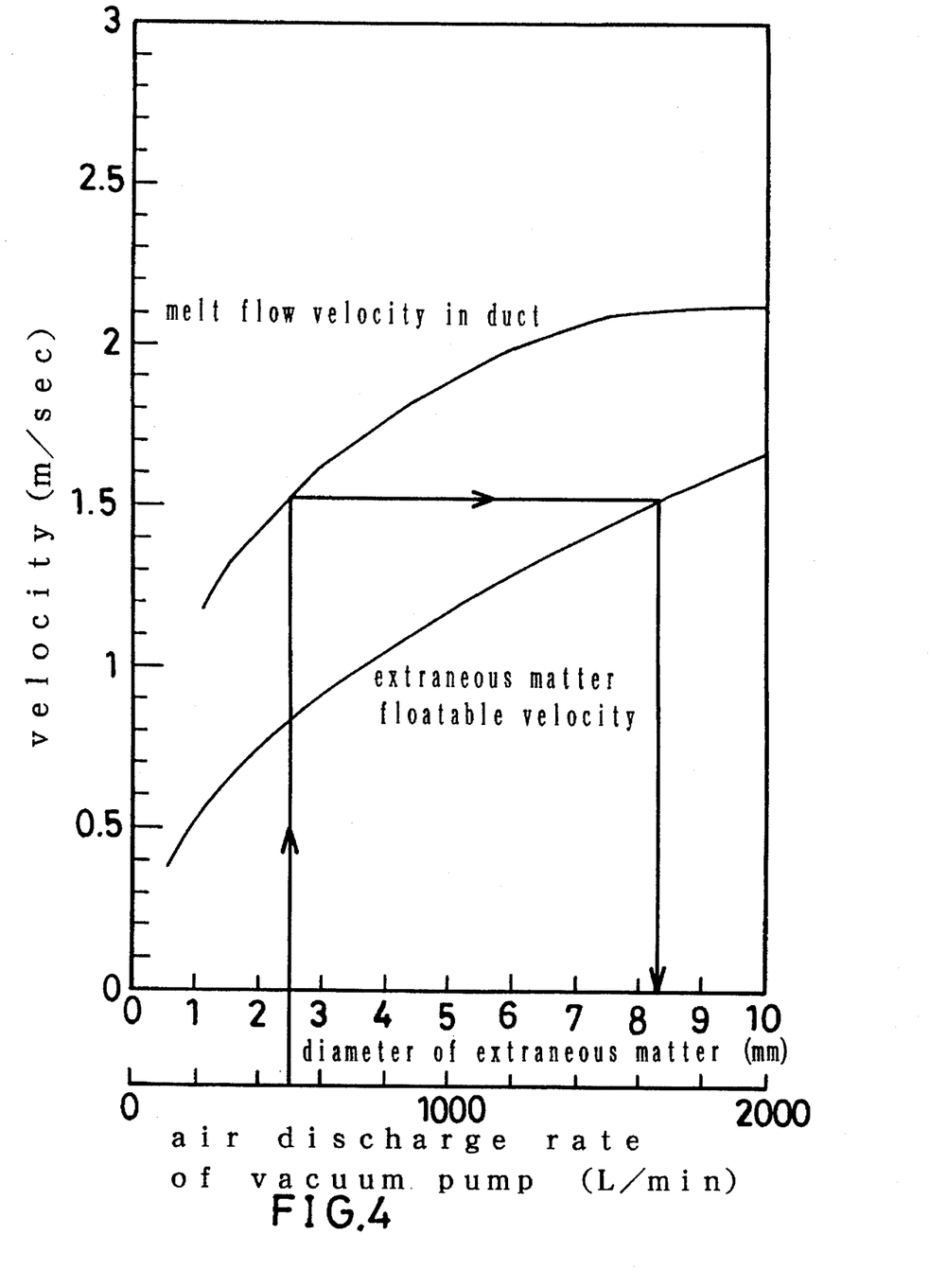
FIG. 4 is a graph showing the relationship between the rate of evacuation by the vacuum pump and extraneous matter aspirated.

In the case where the melt 21 is aspirated in this state, the velocity of the melt 21 aspirated by the pump 20 with an evacuation rate of 500 liters/min is 1.53 m/sec as shown in FIG. 4, so that if the extraneous matter 22 is, for example, in the form of iron balls, balls up to 8.3 mm in diameter can be aspirated.

As will be apparent from FIGS. 2 to 4, extraneous matter 22 of desired size can be removed by aspiration when various conditions, such as the state of the melt 21 and the evacuation rate of the vacuum pump 20 to be used, are altered.

Figure 5:
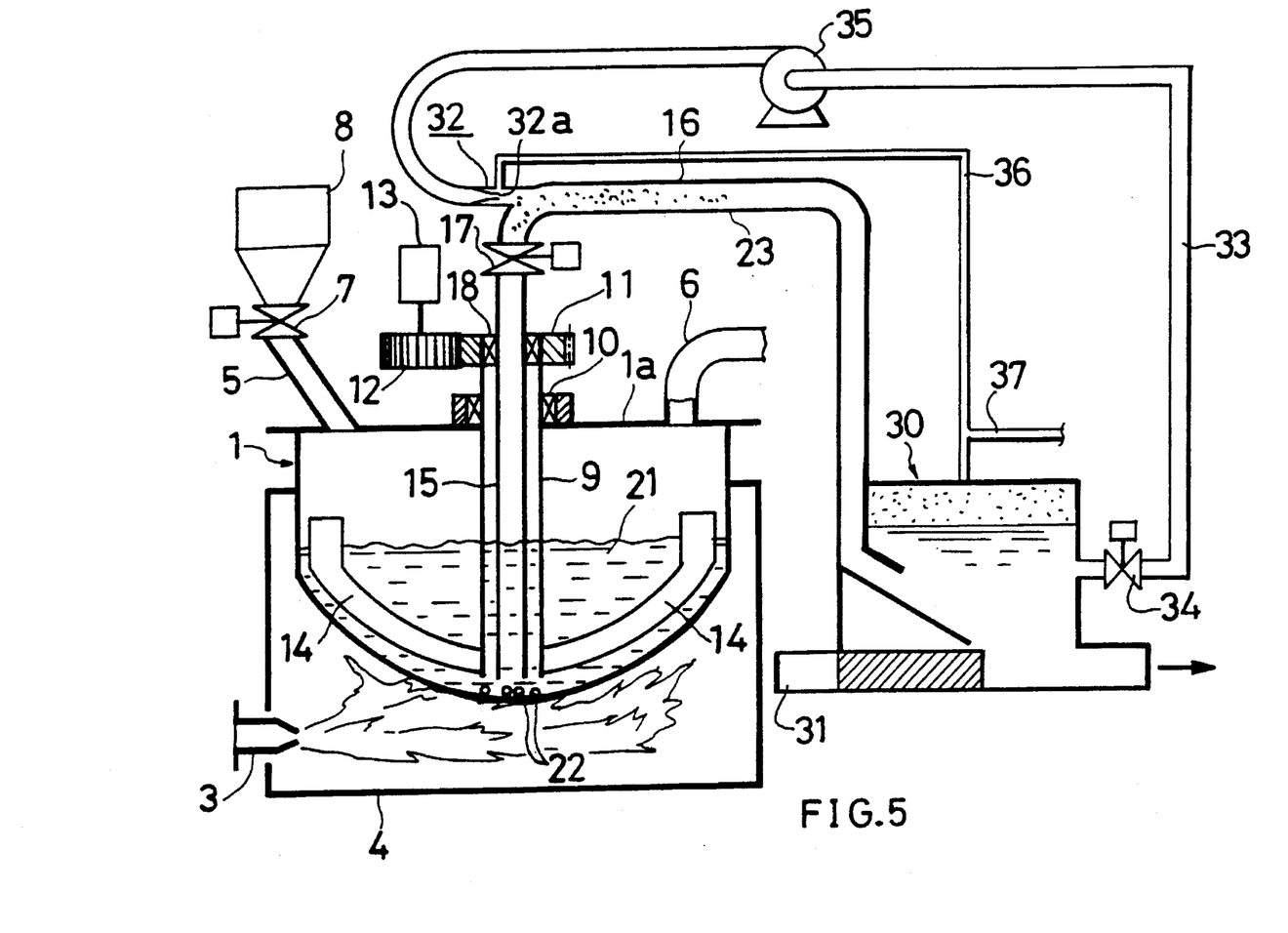
FIG. 5 is a view in vertical section of a second embodiment of plastics thermal decomposition apparatus of the invention.

FIG. 5 shows a second embodiment of plastics thermal decomposition apparatus of the present invention.

Referring to FIG. 5, the apparatus comprises an extraneous matter collecting container 30, and a pusher 31 disposed at the lower portion of the container 30 for discharging to outside extraneous matter accumulating in the bottom of the container 30. Recovered thermal decomposition oil is initially accommodated in the container 30. The container 30 internally has an upper space filled with an inert gas for obviating a hazard of explosion. The inert gas may be replaced by a gas having a low oxygen content, such as exhaust gas.

The end of the conduit 16 closer to the extraneous matter suction pipe 15 is provided with an ejector 32 which is positioned as opposed to the interior of the conduit 16 for discharging a high-speed drive fluid into the conduit 16, whereby the melt in the thermal decomposition reactor 1 is aspirated through the suction pipe 15 and led into the conduit 16. A drive fluid transport pipe 33 extending from the container 30 is connected to the ejector 32. The transport pipe 33 has a valve 34 and a high-pressure pump 35 at intermediate portions thereof. An inert gas supply pipe 36 extending from the container 30 for supplying the inert gas from the container 30 is connected to the ejector 32 at a portion thereof downstream from its nozzle 32a. The supply pipe 36 has an oil vapor discharge pipe 37 branching from an intermediate portion thereof for separating off and discharging oil vapor egressing from the container 30 along with the intert gas.

With the second embodiment described as in the case of the first embodiment, waste plastics including extraneous matter, such as industrial wastes, are hated and melted with the heat of combustion of the heating burner 3 within the reactor 1 to form a melt 21, which undergoes a thermal decomposition reaction and releases a thermal decomposition gas. The gas is sent through the discharge duct 6 to a unit having a catalyst layer, further decomposed into hydrocarbons of low carbon chain in the unit and thereafter led into a cooling-condensation unit, in which the gas is cooled for condensation. Thus, a light oil is recovered.

When the above operation is continued, extraneous matter 22, such as metals and glass, which have great specific gravity and which is present in the melt 21 accumulates on the central portion of bottom wall of the reactor 1, as is the case with the first embodiment. The high-pressure pump 35 is then operated with the two valves 17, 34 opened, whereupon the decomposition oil in the container 30 is discharged from the nozzle 32a of the ejector 32 toward the conduit 16 at a high speed, whereby the inert gas in the container 2 is separated and mixed with the oil. The fluid of gas-liquid mixture phase comprising the oil and the inert gas is injected into the conduit 16 as a high-speed drive fluid, causing the extraneous matter-incorporating melt 21 in the reactor 1 to be aspirated through the suction pipe 15 and sent through the conduit 16 into the container 30. The extraneous matter 22 sent into the container 30 accumulates on the bottom and discharged from the container 30 by the pusher 31. In this way, the extraneous matter 22 is removed without shutting off the decomposition apparatus. The melt 21 sent into the container 30 becomes mixed with the oil in the container 30, and the liquid mixture is thereafter discharged from the nozzle 32a of the ejector 32 as the high-speed drive fluid for removing the extraneous matter.

The thermal decomposition of plastics produces inorganic carbon, which is removed by aspirating the melt 21 periodically or from time to time as is the case with the first embodiment.

With the process wherein the apparatus of the second embodiment is used, the high-speed drive fluid for the ejector is a liquid mixture of aspirated melt of waste plastics and decomposition oil recovered. This eliminates the need to prepare the drive fluid separately.

Further when the high-speed drive fluid is a fluid of gas-liquid mixture phase comprising a liquid and a gas aspirated from the vicinity of the ejector nozzle by discharging the liquid from the nozzle, it becomes less likely that the extraneous matter discharge duct for transporting the melt containing extraneous matter and aspirated from the reactor, and cavitation becomes less likely to occur inside the duct.

Figure 6:
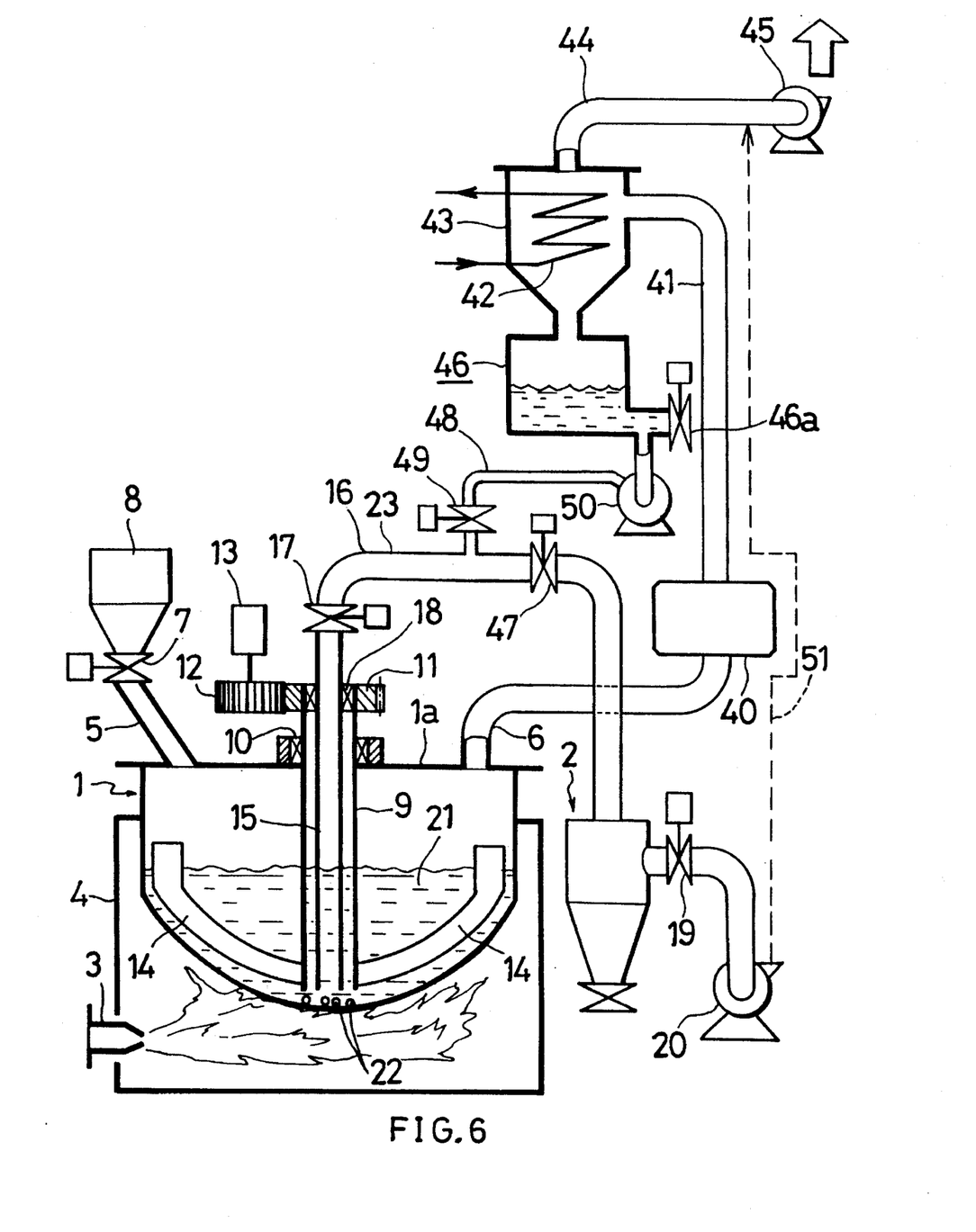
FIG. 6 is a view in vertical section of a third embodiment of plastics thermal decomposition apparatus of the invention.

FIG. 6 shows a third embodiment of plastics thermal decomposition apparatus of the invention.

With reference to FIG. 6 , the apparatus has a thermal decomposition gas discharge duct 6, which is connected to a tank 40 having a catalytic layer for further decomposing hydrocarbons. The tank 40 is connected by a duct 41 to a cooling-condensation tank 43 having a heat exchanger 42. The tank 43 has connected thereto a gas discharge duct 44, through which a gas consisting primarily of hydrocarbons of small number of carbon atoms and remaining uncondensed is sent to unillustrated waste gas treating equipment by a blower 45. Provided in communication with and positioned under the condensation tank 43 is an oil tank 46 for a thermal decomposition oil recovered.

A valve 47 is provided at an intermediate portion of the conduit 16. Between this valve 47 and the valve 17 between the extraneous matter suction pipe 15 and the conduit 16, an oil transport pipe (conduit) 48 extending from the oil tank 46 is connected to the conduit 16. The oil transport pipe 48 is provided with a valve 49, and a pump 50 for forcing the oil from the oil tank 46 into the conduit 16.

With the third embodiment as in the case of the first embodiment, waste plastics including extraneous matter, such as industrial wastes, are heated and melted with the heat of combustion of the heating burner 3 within the reactor 1 to form a melt 21, which undergoes a thermal decomposition reaction and produces a thermal decomposition gas. The decomposition gas is sent through the discharge duct 6 into the tank 40 having the catalyst layer and decomposed into hydrocarbons of small number of carbon atoms. The resulting gas is sent through the duct 41 to the cooling-condensation tank 43, in which the gas is cooled with cooling water flowing through the heat exchanger 42 for condensation, whereby a light decomposition oil is recovered. This oil is stored in the oil tank 46. A gas consisting mainly of hydrocarbons of low carbon content and remaining uncondensed in the tank 43 is sent though the gas discharge duct 44 to the unillustrated waste gas treating equipment by the blower 45 for further treatment. The oil in the oil tank 46 is delivered from the tank 46 for suitable use when a valve 46a provided at an outlet thereof is opened.

When the above operation is continued, extraneous matter 22, such as metals and glass, which has great specific gravity and which is present in the melt 21, accumulates on the central portion of bottom wall of the reactor 1 as in the case of the first equipment. Accordingly, the vacuum pump 20 is operated with the valves 17, 49 closed and also with the valves 47, 19 opened, and the valve 17 is subsequently opened, whereby a vacuum is produced in the container 2, permitting the melt 21 in the reactor 1 to be aspirated along with the extraneous matter through the suction pipe 15 and the conduit 16, i.e., through the extraneous matter discharge duct 23, into the collecting container 2. In this way, the extraneous matter 22 is removed without shutting off the apparatus. When a predetermined amount of melt 21 has been aspirated, the valve 17 is closed, the melt 21 remaining in the portion between the valves 17, 47 is aspirated, the valves 47, 19 are closed, and the vacuum pump 20 is brought to a stop, whereby the extraneous matter removing operation is completed. The gas discharged from the pump 20 during operation is sent to the gas discharge duct 44 through a pipe 51 indicated in a broken line in FIG. 6.

The thermal decomposition of plastics releases inorganic carbon, which is removed by aspirating the melt 21 periodically or from time to time as is the case with the first embodiment.

After the extraneous matter has been removed in this way, the melt 21 partly remains in the upper portion of the suction pipe 15 and in the conduit 16. If the apparatus is held in continued operation in this state, the remaining melt 21 solidifies on cooling. If the removal operation is conducted for a short period of time, such solidification of the remaining melt will not occur, but this becomes unavoidable when the period is prolonged. Since the solidifying melt 21 consists primarily of hydrocarbons having a long carbon chain, the melt, when adhering to the inner peripheral surfaces of the suction pipe 15 and the conduit 16, decreases the inside cross sectional area of the pipe 15 and the conduit 16. In the case where the removal operation is repeated a small number of times, the result will be a reduction in the inside cross sectional area mentioned, and the solid deposit will be melted again by the flow of hot melt 21 during the subsequent removal operation, hence no problem. However, if the removal operation is repeated a large number of times, the solid deposit will grow at the bent portions of the suction pipe 15 and the conduit 16 and in the vicinity of the valves 17, 47, eventually clogging up the suction pipe 15 and the conduit 16 to prevent aspiration.

After the completion of removal operation, therefore, the valve 49 is opened, and the decomposition oil in the oil tank 46 is forced through the oil transport pipe 48 into the conduit 16 by the pump 50. Since the conduit 16 has not fully reduced in temperature owing to the remaining heat, the oil supplied partly evaporates to pressurize the interior of the conduit 16 and, at the same time, dissolves therein the remaining melt 21 consisting primarily of hydrocarbons of long carbon chain. The valve 17 is then opened in this state, whereupon a gas-liquid mixture is formed to jet through the suction pipe 15, returning the melt remaining in the upper portion of the pipe 15 to the interior of the reactor 1 and dissolving and washing away the melt 21 adhering to the inner peripheral surface of the pipe 15 to return the melt to the interior of the reactor 1. A specified period of time thereafter, the valve 49 and the valve 17 are closed in this order, and the pump 50 is brought out of operation. Consequently, the suction pipe 15 and the portion of the conduit 16 from the pipe 15 to the valve 47 are thoroughly cleaned internally and made free of any trouble for the next removal operation. The decomposition oil returned to the reactor 1 evaporates again inside the reactor 1, is recovered as oil by the cool-condensation tank 43 and therefore will not be consumed. When there is a need to clean the interior of the portion of the conduit 16 extending from the valve 47 to the collecting container 2, the valve 49 and the valve 47 are opened while the valve 17 in its closed state. The same gas-liquid mixture as mentioned above then cleans the piping system which is held in a vacuum.

The decomposition oil accommodated in the oil tank 46 and used for cleaning as described above is originally formed by cutting the carbon chain of the melt 21 and therefore very readily dissolves the adhering solid deposit of the melt 21. The oil is capable of dissolving the solid deposit when in any ratio relative to the deposit.

To substantiate the advantage of the present apparatus of the invention specifically, the operation described above was conducted using polyethylene, polypropylene or polystrene as material plastics. As a result, the suction pipe 15 and the conduit 16 were found free of clogging in any of these cases.

With the apparatus of the third embodiment, there is the likelihood of the piping becoming clogged up if the melt adhering to and remaining on the extraneous matter discharge duct solidifies on cooling after the cessation of aspiration of the melt and extraneous matter. However, the solid deposit of melt is dissolved by being acted on by the decomposition oil which is forced through the discharge duct from the oil tank via a conduit. Further when the oil is sent into the discharge duct from the oil tank periodically, the solid deposit of melt is dissolved by the action of the oil, preventing clogging of the discharge duct. Moreover, the oil thus utilized is recovered again, hence no waste.

Figure 7:
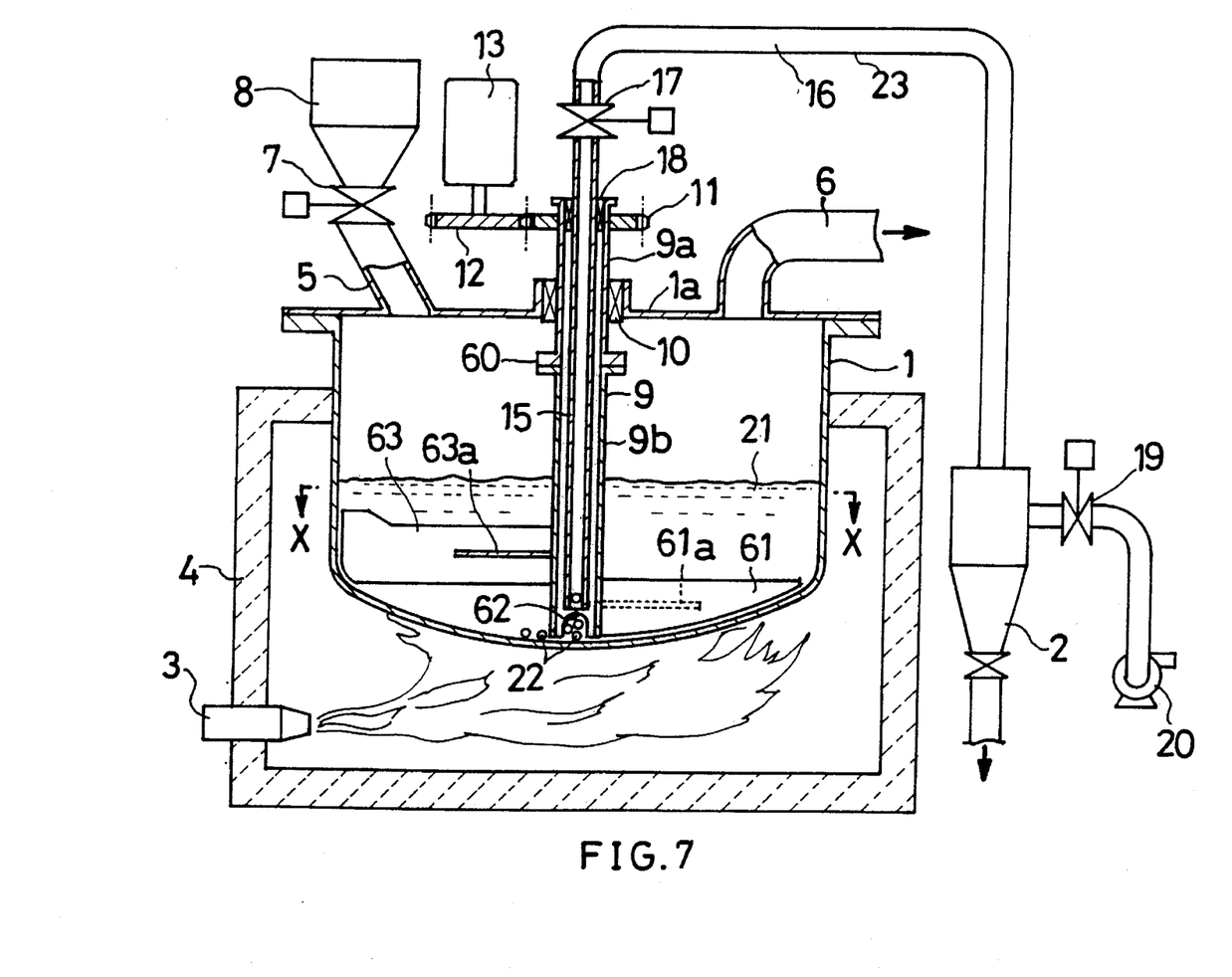
FIG. 7 is a view in vertical section of a fourth embodiment of plastics thermal decomposition apparatus of the invention.
Figure 8:
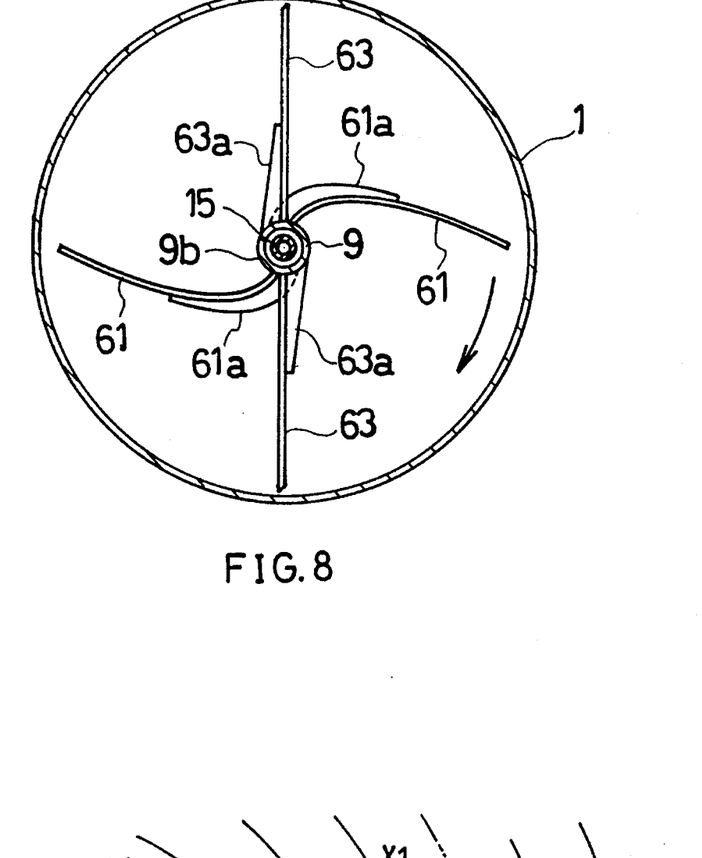
FIG. 8 is a view in section taken along the line X—X in FIG. 7.
Figure 9:
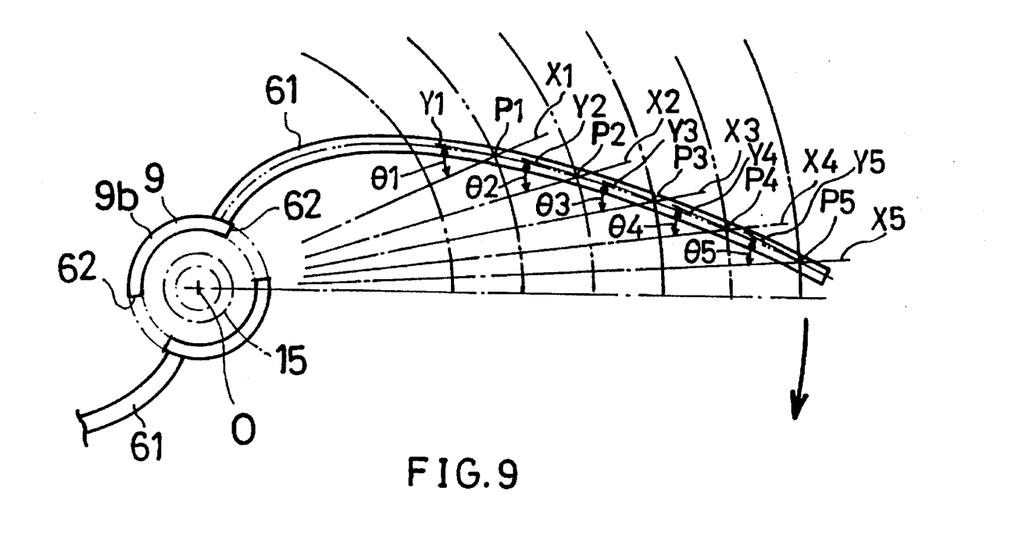
FIG. 9 is a plan view showing agitating blades of the fourth embodiment.

FIGS. 7 to 9 show a fourth embodiment of plastics thermal decomposition apparatus of the present invention.

Referring to FIGS. 7 and 8, a hollow vertical rotary shaft 9 comprises an upper component 9a, and a lower component 9b having a circular cross section and connected to the lower end of the upper component 9a by a flange joint 60. The shaft 9 extends through a hole formed in a closure 1a. A clearance in the hole around the upper comonent 9a of the shaft 9 is sealed by a seal device 10. The lower component 9b of the rotary shaft 9 has a lower end portion positioned close to the bottom of the thermal decomposition reactor 1.

The lower component 9b of the two rotary shaft 9 is fixedly provided at the lower end portion of its peripheral wall with two agitating blades 61 projecting radially outward from the shaft, positioned symmetrically with respect to the center of rotation of the rotary shaft 9 and curved forward with respect to the direction of rotation of the shaft 9 as it extends radially outward. A rib 61a is formed over the rear face, with respect to the direction of rotation, of each agitating blade 61 to extend to the peripheral wall of the lower component 9b of the shaft 9. When seen from above, the agitating blade 61 has a shape resembling a parabola having a vertex at the junction of the outer periphery of the shaft 9 and the blade. As shown in FIG. 9, lines X1 to X5 extending through the center O of rotation of the rotary shaft 9 and a plurality of points P1 to P5 arranged on the blade 61 longitudinally thereof at a spacing make angles $\theta 1$ to $\theta 5$ with the lines Y1 to the agitating blade 61 at the points P1 to P5, respectively, Preferably, each of these angles $\theta 1$ to $\theta 5$ is in the range of 25 to 30 deg. The shaft lower component 9b is formed in the lower end of its peripheral wall with a cutout 62 serving as a passage for extraneous matter and positioned forwardly of the base end of each agitating blade 61 with respect to the direction of rotation.

The lower component 9b of the vertical rotary shaft 9 is fixedly provided on its peripheral wall with two agitating blades 63 which are straight when seen from above, positioned slightly above the parabolic agitating blades 61 and projected radially outward. When seen from above, these agitating blades 63 are in alignment with each other. When seen from above, a straight line extending through the outer ends of the two parabolic agitating blades 61 is approximately at right angles with each straight agitating blade 63. A rib 63a is formed over the rear face, with respect to the direction of rotation, of each blade 63 to extend to the peripheral wall of the shaft lower component 9b.

The lower end of the discharge duct 15 provided inside the rotary shaft 9 is positioned slightly above the cutouts 62 in the peripheral wall of the shaft lower component 9b.

With the construction described, material waste plastics including extraneous matter, such as industrial wastes, are supplied from the hopper 8 to the reactor 1 through the supply duct 5 by opening the valve 7. The plastics are heated and melted with the heat of combustion of the burner 3 to form a melt 31. To render the melt 21 of plastics uniform in temperature distribution for an expedited reaction, the rotary shaft 9 is rotated by the drive motor 13 in the direction of arrow shown in FIGS. 8 and 9, causing the blades 61, 63 to agitate the melt 21 in the reactor 1, whereupon the melt 21 undergoes a thermal decomposition reaction, producing a thermal decomposition gas. The gas produced is sent through the discharge duct 6 to a unit having a catalyst layer, in which the gas is further decomposed into hydrocarbons of low carbon chain. The hydrocarbons are sent to a cooling-condensation unit, cooled for condensation in the unit and recovered as a light oil.

When the above operation is continued, extraneous matter 22, such as metals and glass, which has great specific gravity and present in the melt 21 settles and accumulates in the bottom of the reactor 1. The extraneous matter 22 is not scattered centrifugally by virtue of the action of the parabolic agitating blades 61 but is collected in the central portion of the reactor bottom in the vicinity of the rotary shaft 9. Accordingly, when the vacuum pump 20 is operated with the valves 17, 19 opened, the discharge duct 2 is evacuated, and the extraneous matter 22 in the reactor 1 moves through the cutouts 62 in the shaft lower component 9b into the shaft 9 along with the melt 21 and is aspirated into the container 2 by way of the suction pipe 15 and the conduit 16, i.e., the discharge duct 23. The cutouts 62 are each positioned forwardly of the base end of the blade 61 at the peripheral wall lower end of the lower component 9b with respect to the direction of rotation, so that the extraneous matter 22 collected in the vicinity of the shaft 9 by the blades 61 smoothly ingresses into the shaft 9. In this way, the extraneous matter 22 is removed without shutting off the apparatus.

If the parabolic blades 61 are not present in the fourth embodiment but the straight blades 63 only are present, the settling matter is scattered about centrifugally.

With the fourth embodiment described, each of the lower curved agitating blades 61 is parabolic when seen from above, whereas the blade is not limited in shape insofar as the blade is in the form of a curve extending from the outer surface of peripheral wall of the shaft and having a gradually decreasing curvature toward its outer end when seen from above. Further with the fourth embodiment, the straight agitating blades are fixedly provided on the vertical rotary shaft in addition to the curved blades. whereas this arrangement is not limitative; the parabolic blades alone may be provided fixedly. Although the aspiration means of the fourth embodiment is a vacuum pump, the suction means is not limited thereto but may comprise an ejector or jet pump. Although the extraneous matter passage portion of the present embodiment is a cutout formed in the lower end of peripheral wall of the rotary shaft, this is not limitative.

According to the fourth embodiment, the action of the agitating blades produced when the rotary shaft is rotated elminates the likelihood that the extraneous matter present, in the melt of plastics will be scattered about centrifugally, and collects the matter in the vicinity of the shaft within the reactor. The matter, as so collected, can be aspirated through the discharge duct along with the melt of plastics in the reactor by the aspiration means, whereby the extension matter is removed. Moreover, an improved removal efficiency can be achieved because the agitating blades act to collect the extraneous matter in the vicinity of the rotary shaft within the reactor without permitting the extraneous matter to be centrifugally scattered about. Additionally, the operation of the agitating blades effected by the rotation of the shaft gives a uniform temperature distribution to the melt of plastics to attain an improved thermal decomposition efficiency.

Figure 10:
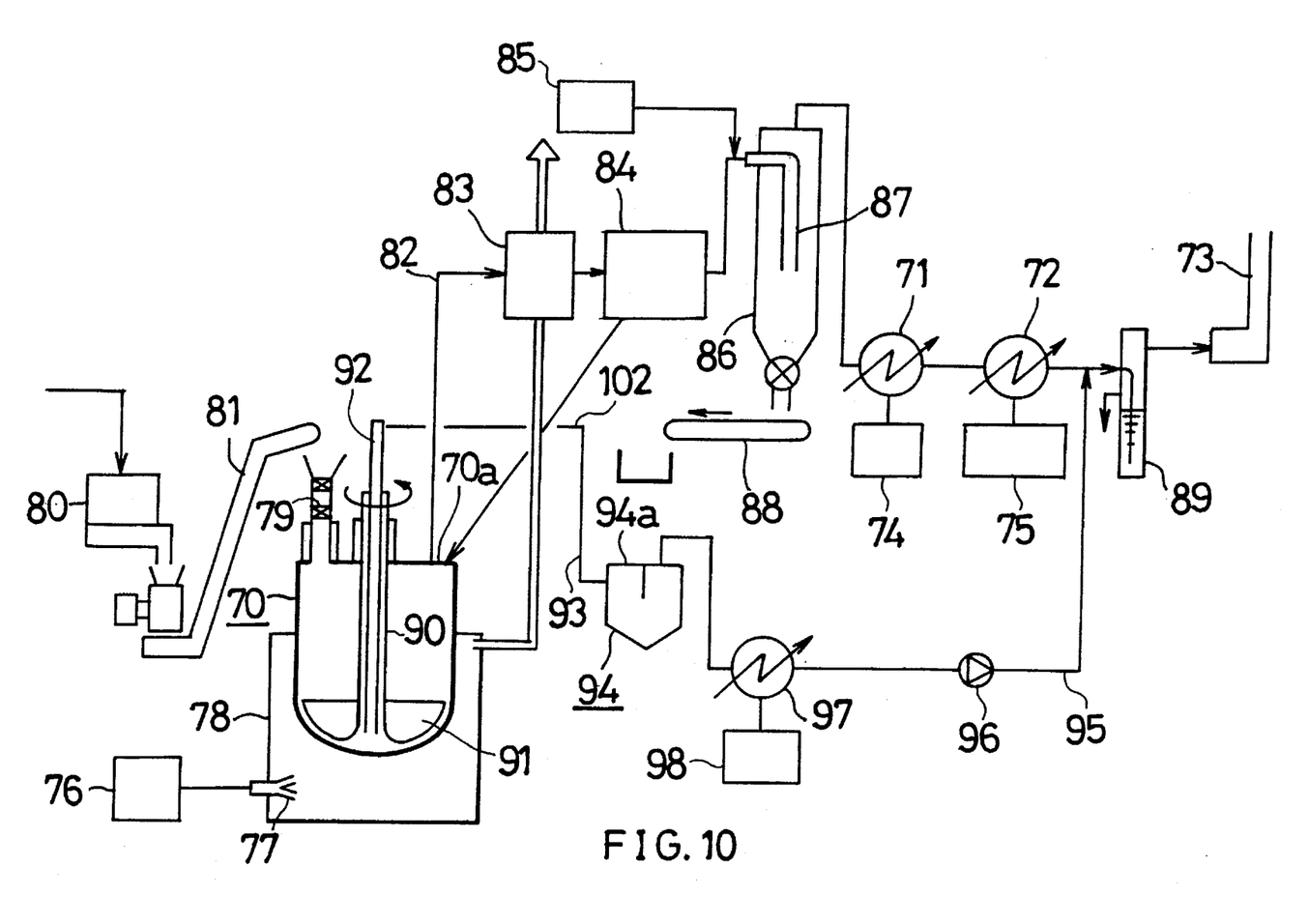
FIG. 10 is an overall diagram showing a fifth embodiment of plastics thermal decomposition apparatus of the invention.

FIG. 10 shows a fifth embodiment of plastics thermal decomposition apparatus.

With reference to FIG. 10, the apparatus comprises a thermal decomposition reactor 70 for melting and thermally decomposing waste plastics including polyvinyl chloride in its interior, a first condenser 71 disposed downstream from the reactor 70 for condensing a thermal decomposition gas produced in the reactor 70 by cooling to obtain kerosene (decomposition oil), a second condenser 72 disposed downstream from the first condenser 71 for cooling and condensing the portion of the gas not condensed by the first condenser 71 to obtain gasoline (decomposed oil), and a gas combustion furnace 73 disposed downstream from the second condenser 72 for burning the inflammable portion of the gas not condensed by the two condensers 71, 72. The kerosene recovered by the first condenser 71 is stored in a kerosene tank 74. The gasoline recovered by the second condenser 72 is stored in a gasoline tank 75.

The reactor 70 is provided in a furnace 78 having a heating burner 77 to which thermal decomposition oil is supplied from a recovered oil tank 76 as a fuel. The reactor 70 has a bottom wall formed with a downwardly curving-in concave upper surface. The reactor has a top wall 70a having a waste plastics feed inlet 79 which is free to open or close. Waste plastics transported from a receptacle 80 by a conveyor 81 are supplied to the reactor 70 through the feed inlet 79. The reactor top wall 70a is provided with a thermal decomposition gas discharge duct 82 having a forward end connected to the first condenser 71.

The discharge duct 82 is provided at an intermediate portion thereof with a reformer 83 by which the thermal decomposition gas produced in the reactor 70 is reformed to a low-boiling fraction. The reformer 83 is heated with the combustion exhaust gas from the burner 77 for heating the reactor 70. After heating the reformer 83, the exhaust gas from the burner is released into the atmosphere.

A heavy oil collecting unit 84 for trapping a high-boiling fraction which has not been fully reformed by the reformer 83 is provided at an intermediate portion of the discharge duct 82 downstream from the reformer 83. The heavy oil trapped by the unit 84 is returned to the reactor 70.

A feeder 85 for supplying a desalting agent to the interior of the duct 82 is disposed at an intermediate portion of the duct 82 downstream from the collecting unit 84.

A desalting column 86 for reacting HCl gas with the desalting agent is disposed at an intermediate portion of the duct 82 downstream from the feeder 85. A downward duct 87 is disposed inside the desalting column 86. Disposed below the column 86 is a screw conveyor 88 by which a solid chloride resulting from the reaction between HCl gas and the desalting agent is continuously discharged from the bottom of the desalting column 86.

Positioned downstream from the second condenser 72 and upstream from the gas combustion furnace 73 is a water seal device 89 for preventing reverse flow of the decomposition gas to preclude a backfire.

A hollow vertical rotary shaft 90 extends through the top wall 70a of the reactor 70 and has a lower end positioned in the vicinity of the bottom of the reactor 70. The shaft 90 has an upper end positioned above the top wall 70a and coupled to a drive motor by an unillustrated reduction gear. The lower end of the shaft 90 is fixedly provided with a plurality of agitating blades 91. Each of the blades 91 has a lower edge which is generally arcuate in conformity with the shape of the bottom wall upper surface of the reactor 70.

A vertical extraneous matter suction pipe 92 is provided inside the rotary shaft 90. The pipe 92 has an upper end extending upward beyond the upper end of the shaft 90 and connected to an extraneous matter collecting container 94 by a conduit 93. The suction pipe 92 and the conduit 93 constitute an extraneous matter discharge duct 102. A duct 95 has one end connected to the discharge duct 82 at a position between the second condenser 72 and the water seal device 89, and the other end connected to the top wall 94a of the container 94. A vacuum pump 96 is mounted on an intermediate portion of the duct 95 for aspirating an extraneous matter-containing melt from the reactor 70 into the container 94. A condenser 97 is provided on the duct 95 at a position between the container 94 and the vacuum pump 96 for cooling and condensing the thermal decomposition gas contained in the melt aspirated from the reactor 70 by the suction pump 96. The condenser 97 recovers a thermal decomposition oil, which is collected in a tank 98.

With the apparatus described above, waste plastics including extraneous matter and polyvinyl chloride and accommodated in the receptacle 80 are transported by the conveyor 81 and supplied to the reactor 70 through the feed inlet 78. When a specified amount of waste plastics have been fed to the container 70, the feed inlet 79 is closed. The plastics are heated and melted with the combustion gas of the burner 77 to form a melt. When maintained at a temperature not lower than a predetermined level, the melt undergoes a thermal decomposition reaction, producing a thermal decomposition gas. To expedite the reaction, the rotary shaft 90 is rotated by an unillustrated motor to agitate the melt in the reactor by the blades 91. The gas produced is sent through the discharge duct 82 to the reformer 83, heated with the combustion exhaust gas from the burner 77 for heating the reactor 70 and reformed to a low-boiling component. The gas thus reformed is sent through the duct 82 to the first condenser 71. A high-boiling component of the gas which has not been fully reformed by the reformer 83 is trapped by the heavy oil collecting unit 84 as a heavy oil. The heavy oil trapped by the unit 84 is returned to the reactor 70 and subjected to thermal decomposition again.

The feeder 85 adds $Ca(OH)_2$, or the like, serving as a desalting agent to the decomposition gas passing through the unit 84. The gas containing the desalting agent is sent to the desalting column 86, in which the gas descends the downward duct 87. Inside the duct 87, HCl gas in the decomposition gas flows down concurrently with the desalting agent and reacts therewith in the meantime to form a solid chloride ($CaCl_2$), which spontaneously settles and accumulates on the bottom of the column. The accumulation is continuously discharged from the bottom by the screw conveyor 88.

The internal temperature of the desalting column 86 is maintained at the same level as, or slightly higher level than, the temperature of the heavy oil collecting unit 84 so as not to permit condensation of the decomposition gas within the column 86. The temperature of the collecting unit 84 varies with the properties of the oil to be recovered. Preferably, the internal temperature of the desalting column 86 is within the range of 120° to 300° C. The lower limit of this temperature range, i.e., 120° C., is a value determined as a temperature which is not lower than the azeotropic point of HCl gas and water and at which the reaction product ($CaCl_2$) of HCl gas and $Ca(OH)_2$ will not deliquesce even in the presence of 20% of water in the decomposition gas. The upper limit temperature of 300° C. is determined because if the temperature of the unit 84 is higher, an increased amount of waxy oil will be recovered.

The low-boiling component of the gas flowing out from the top of the column 86 is cooled first in the first condenser 71 for condensation, whereby kerosene is recovered. The recovered kerosene is stored in the kerosene tank 74. The low-boiling component of the gas passing through the first condenser 71 without condensation is sent to the second condenser 72, in which it is cooled for condensation, whereby gasoline is recovered. The recovered gasoline is collected in the gasoline tank 75.

The decomposition gas portion remaining uncondensed by the second condenser 72 is sent to the gas combustion furnace 73 by way of the water seal device 89 and burned in the furnace.

When the above operation is continued, the extraneous matter, such as metals and glass, which is present as mixed with the waste plastics accumulates in the reactor 70 owing to the melting of the plastics. Extraneous matter, such as metals and glass, which have great specific gravity collects in the central portion of bottom wall of the reactor 70 because of a collecting effect of the agitating blades 91 due to the shape thereof and because of the shape of the bottom wall upper surface of the reactor 70. When the amount of accumulating extraneous matter increases, problems arise such as damage to the agitating blades 91 and adhesion of scorching melt to the bottom of the reactor 70. When the vacuum pump 96 is operated to avoid the problems, the melt in the reactor 70 is aspirated together with the extraneous matter through the suction pipe 92 and the conduit 93, i.e., through the discharge duct 102, into the container 94 which is evacuated. In this way, the extraneous matter is removed without shutting off the apparatus.

When the melt is aspirated into the container 94, a negative pressure occurs in the reactor 70. Although an inert gas is sent into the reactor 70 for the adjustment of pressure when the negative pressure occurs, the apparatus nevertheless inevitably becomes negative in pressure, with the resulting likelihood that the decomposition gas sent out from the reactor 70 will flow reversely. However, the water seal device 89 acts to prevent the reverse flow of the gas, permitting the gas to be reliably sent to the gas combustion furnace 73 and burned therein. This prevents occurrence of a backfire.

Although the fifth embodiment described has two condensers for cooling the decomposition gas for condensation, the number of condensers is not limited to two. Although the deposition gas not condensed by the condensers is burned in the combustion furnace 73 according to the fifth embodiment, the gas may alternatively be recovered by a collecting device.

Figure 11:
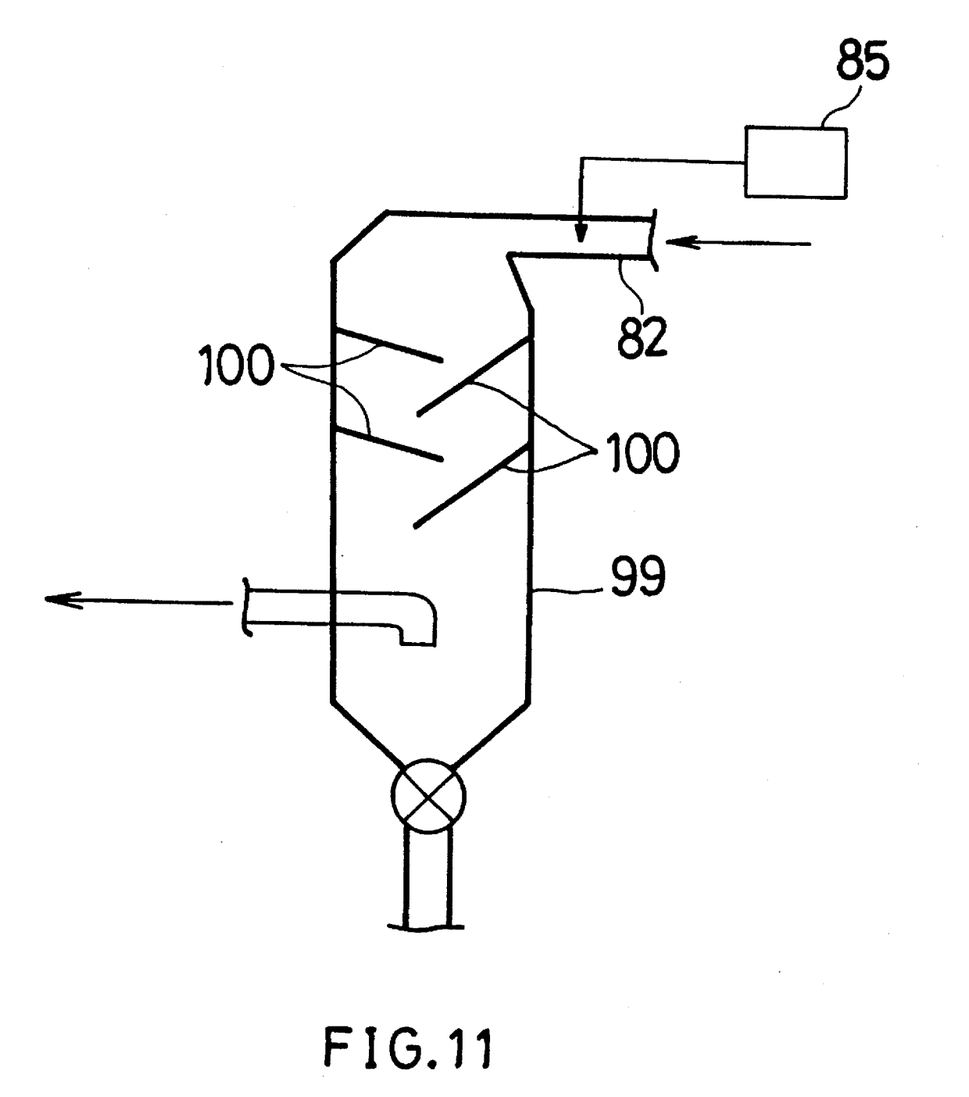
FIG. 11 is a view in vertical section showing a modification of desalting column of the fifth embodiment.

FIG. 11 shows a modification of the desalting column of the fifth embodiment. With reference to FIG. 11, a plurality of slanting plates 100 are provided inside a desalting column 99 in a staggered arrangement so as to lengthen the residence time of the desalting agent in the column 99 for the effective use of the agent. While the desalting agent sent in from the top of the column flows down the slanting plates 100 zigazg, the agent reacts with the HCl gas in the decomposition gas sent in from the column top.

What is claimed is:

1. A thermal decomposition apparatus for plastics mixed with extraneous industrial waste matter wherein plastics are melted and thermally decomposed, and the resulting decomposition gas is cooled for condensation and recovered in the form of a thermal decomposition oil, the apparatus comprising a thermal decomposition reactor for melting and thermally decomposing the plastics therein, an extraneous matter discharge duct have one end opened in a melt of plastics within the reactor, an extraneous matter collecting container connected to the other end of the discharge duct, and aspiration means for generating a pressure difference between said reactor and said collecting container in order to induce a flow of said extraneous matter within the reactor together with the melt of plastics through the discharge duct into the collecting container.

2. An apparatus as defined in claim 1 wherein the aspiration means is a pressure adjusting means for adjusting the internal pressure of the collecting container to a value lower than atmospheric pressure.

3. An apparatus as defined in claim 2 wherein the pressure adjusting means is a vacuum pump.

4. An apparatus as defined in claim 1 wherein the aspiration means is an ejector communicating with the interior of the discharge duct and having a nozzle for inducing a flow of extraneous matter together with the melt of plastics by a high-speed drive fluid discharged from the nozzle into said discharge duct.

5. An apparatus as defined in claim 4 wherein the high-speed drive fluid is a liquid mixture of the aspirated melt of plastics as separated from the extraneous matter and the recovered thermal decomposition oil.

6. An apparatus as defined in claim 4 wherein the high-speed drive fluid is a fluid of gas-liquid mixture phase comprising a liquid and a gas aspirated from the vicinity of the ejector nozzle by discharging the liquid from the nozzle into said discharge duct.

7. An apparatus as defined in claim 1 which further comprises a cooling-condensation unit for cooling and condensing the decomposition gas produced in the reactor to obtain thermal decomposition oil, an oil tank for storing the oil obtained by the cooling-condensation unit, and a conduit connecting the oil tank to the discharge duct.

8. An apparatus as defined in claim 1 which further comprises a vertical hollow rotary shaft having a lower portion to be immersed in the melt of plastics within the reactor and an upper portion projecting upward beyond an upper end of the reactor, the discharge duct being concentrically disposed inside the rotary shaft so as to be immersed at a lower portion thereof in the melt of plastics.

9. An apparatus as defined in claim 8 wherein the rotary shaft is provided with fixedly attached agitating blades projecting radially outward from the outer surface of its lower end portion.

10. An apparatus as defined in claim 9 wherein each of the agitating blades is curved forward with respect to the direction of rotation of the rotary shaft as the blade extends radially outward, and when seen from above, the agitating blade is in the form of a curve extending from the outer surface of peripheral wall of the shaft and having a gradually decreasing curvature toward its outer end.

11. An apparatus as defined in claim 10 wherein the rotary shaft is formed in the lower end of its peripheral wall with an extraneous matter passage positioned forwardly of the base end of the agitating blade with respect to the direction of rotation, and the portion of the discharge duct disposed inside the rotary shaft has a lower end positioned above the extraneous matter passage.

12. An apparatus as defined in claim 8 wherein the reactor has a bottom wall formed with a downwardly curving-in concave upper surface, and the rotary shaft is fixedly provided on the outer surface of its lower end with agitating blades projecting radially outward and each having an arcuate lower edge.

13. A thermal decomposition apparatus for plastics mixed with extraneous industrial waste matter wherein plastics including polyvinyl chloride are melted and thermally decomposed, and the resulting decomposition gas is cooled for condensation and recovered in the form of a thermal decomposition oil, the apparatus comprising a thermal decomposition reactor for melting and thermally decomposing the polyvinyl chloride—including plastics therein, an extraneous matter discharge duct having one end opened in a melt of plastics within the reactor, an extraneous matter collecting container connected to the other end of the discharge duct, aspiration means for aspirating extraneous matter within the reactor together with the melt of plastics through the discharge duct into the collecting container, means disposed downstream from the reactor for supplying a desalting agent to a thermal decomposition gas containing HCl gas and produced in the reactor, a desalting column disposed downstream from the supplying means for reacting the HCl gas in the decomposition gas with the desalting agent, and a condenser disposed downstream from the desalting column for cooling the decomposition gas for condensation to obtain a thermal decomposition oil.

* * * * *